(12) United States Patent
Masuda

(10) Patent No.: US 12,438,191 B2
(45) Date of Patent: Oct. 7, 2025

(54) ELECTROLYTE ADDITIVE

(71) Applicant: Nisshinbo Holdings Inc., Tokyo (JP)

(72) Inventor: Gen Masuda, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 1052 days.

(21) Appl. No.: 17/441,451

(22) PCT Filed: Mar. 25, 2019

(86) PCT No.: PCT/JP2019/012452
§ 371 (c)(1),
(2) Date: Sep. 21, 2021

(87) PCT Pub. No.: WO2020/194438
PCT Pub. Date: Oct. 1, 2020

(65) Prior Publication Data
US 2022/0166064 A1 May 26, 2022

(51) Int. Cl.
*H01M 10/0567* (2010.01)
*C07F 7/08* (2006.01)
*C07F 9/40* (2006.01)
*H01G 11/60* (2013.01)
*H01G 11/64* (2013.01)
*H01M 10/0525* (2010.01)
*H01M 10/0568* (2010.01)
*H01M 10/0569* (2010.01)

(52) U.S. Cl.
CPC ....... *H01M 10/0567* (2013.01); *C07F 7/0805* (2013.01); *C07F 7/081* (2013.01); *C07F 9/4075* (2013.01); *H01G 11/60* (2013.01); *H01G 11/64* (2013.01); *H01M 10/0525* (2013.01); *H01M 10/0568* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

2018/0269529 A1   9/2018   Yuyama

FOREIGN PATENT DOCUMENTS

| JP | 11-31526 A | 2/1999 |
|---|---|---|
| JP | 2000-123867 A | 4/2000 |
| JP | 2007-165125 A | 6/2007 |
| JP | 2010-205870 A | 9/2010 |
| JP | 2012-38900 A | 2/2012 |
| JP | 2015-72867 A | 4/2015 |
| JP | 2015-125950 A | 7/2015 |
| JP | 2017-62955 A | 3/2017 |
| JP | 2018-92778 A | 6/2018 |

OTHER PUBLICATIONS

Philipp et al., "Structure-property relationship and transport properties of structurally related silyl carbonate electrolytes", Electrochimica Acta, 2015, vol. 173, pp. 687-697, (11 pages).
International Search Report dated Jun. 18, 2019, issued in counterpart International Application No. PCT/JP2019/012452 (2 pages).

*Primary Examiner* — Ula C Ruddock
(74) *Attorney, Agent, or Firm* — WHDA, LLP

(57) ABSTRACT

The electrolyte additive includes a neutral compound represented by formula (1) and having, in the molecule, a trialkyl silyl group. It can improve the withstand voltage of the electrolyte and be applied to electrolyte for lithium-ion rechargeable batteries. In formula (1), $R^1$ each represent independent C1-8 alkyl groups, $R^2$ each represent independent C1-8 alkyl groups, A represents a C1-10 alkylene group, X represents either a single bond, a methylene group or one of the linking groups represented by formulas (2) to (4), m represents an integer from 1 to 3, n represents an integer from 0 to 2, where m+n is 2 if X is a single bond, a methylene group, a linking group represented by formula (2) or a linking group represented by formula (3), and m+n is 3 if X is a linking group represented by formula (4). In formula (3), $R^3$ represents a C1-8 alkyl group.

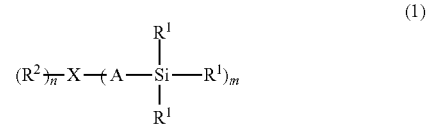

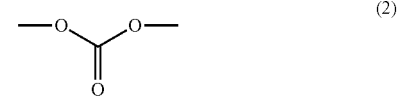

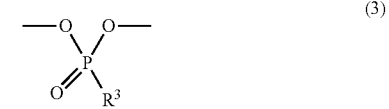

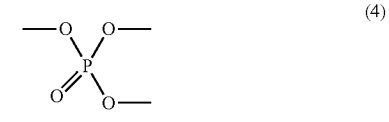

17 Claims, 3 Drawing Sheets

ELECTROLYTE ADDITIVE

TECHNICAL FIELD

The present invention relates to an electrolyte additive, and more particularly to electrolyte additive including a neutral molecule having a trialkylsilyl group.

BACKGROUND ART

In recent years, the spread of portable electronic devices such as digital cameras, smartphones and tablet devices has been remarkable. Accordingly, the demand for power storage devices such as secondary batteries which are used as power sources for these devices and which can be repeatedly used by charging has considerably grown, and the power storage devices have been increasingly demanded to have a higher capacity and a higher energy density.

Generally, in these power storage devices, a solution obtained by dissolving an ion-conductive salt in an aprotic organic solvent is used as an electrolytic solution.

Incidentally, in a power storage device aimed at high-voltage operation, the voltage resistance of an electrolytic solution is a factor that determines the upper limit potential of the device, and at a high voltage, an organic solvent or an ion-conductive salt forming the electrolytic solution may be exposed to a high voltage and electrically decomposed on an electrode surface. Thus, an electrolytic solution having further excellent voltage resistance is required.

As a technique for improving the voltage resistance of the electrolytic solution, methods including adding any of various additives to an electrolytic solution have been reported (see, for example, Patent Document 1 to 4), but there is room for further improvement in terms of a voltage resistance improving effect and suppression of an increase in internal resistance.

In addition, ionic liquids are known to have high voltage resistance, but are inferior to general organic solvents in ion conductivity at low and ordinary temperatures, and are not suitable for devices which are engaged in high-voltage operation.

In view of these points, the present applicant has already reported that when a compound having a silicon-containing sulfonate anion is added to an existing electrolytic solution, the voltage resistance of an electrolytic solution is improved, and when the electrolytic solution is used, a power storage device, such as a secondary battery or a capacitor, which has good life performance, can be obtained (Patent Document 5).

However, a compound having a silicon-containing sulfonate anion as described in Patent Document 5 may be difficult to apply to an electrolytic solution because there are cases where when added to an electrolytic solution containing a $LiPF_6$-based electrolyte, the compound causes salt exchange with a $PF_6$ anion rapidly, are converted into a Li salt hardly soluble in an electrolytic solution solvent used, and are precipitated.

PRIOR ART DOCUMENTS

Patent Documents

Patent Document 1: JP-A 2000-123867
Patent Document 2: JP-A 2007-165125
Patent Document 3: JP-A 2010-205870
Patent Document 4: JP-A 2012-038900
Patent Document 5: JP-A 2017-62955

SUMMARY OF INVENTION

Technical Problem

The present invention has been made in view of these circumstances, and an object of the present invention is to provide a novel electrolyte additive which can improve the voltage resistance of an electrolytic solution and is also applicable to an electrolytic solution for a lithium ion secondary battery.

Solution to Problem

The present inventor has extensively conducted studies for achieving the above-described object, and resultantly found that when a predetermined neutral molecule having at least one trialkylsilyl group in the molecule is added to an existing electrolytic solution, or used as a solvent for an electrolytic solution itself, voltage resistance is improved, leading to completion of the present invention.

That is, the present invention provides:

1. an electrolyte additive including a neutral compound of formula (1) which has a trialkylsilyl group in the molecule:

[Chem. 1]

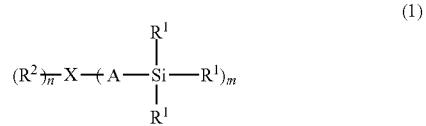

(1)

wherein $R^1$s each independently represent an alkyl group having 1 to 8 carbon atoms, $R^2$s each independently represent an alkyl group having 1 to 8 carbon atoms, A represents an alkylene group having 1 to 10 carbon atoms, X represents one selected from a single bond, a methylene group and any one of linking groups of the following formulae (2) to (4), m represents an integer of 1 to 3, and n represents an integer of 0 to 2, where m+n is 2 when X is a single bond, a methylene group, a linking group of the following formula (2) or a linking group of the following formula (3), and m+n is 3 when X is a linking group of the following formula (4):

[Chem. 2]

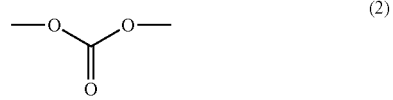

(2)

(3)

(4)

wherein $R^3$ in formula (3) represents an alkyl group having 1 to 8 carbon atoms;

2. the electrolyte additive according to 1, wherein m is 2 or 3, and the n is 0;

3. the electrolyte additive according to 1 or 2, wherein each of all $R^1$s is a methyl group;

4. the electrolyte additive according to any one of 1 to 3, wherein A is an alkylene group having 2 to 5 carbon atoms;

5. the electrolyte additive according to 1, including any of compounds of the following formulae (1A) to (1D):

[Chem. 3]

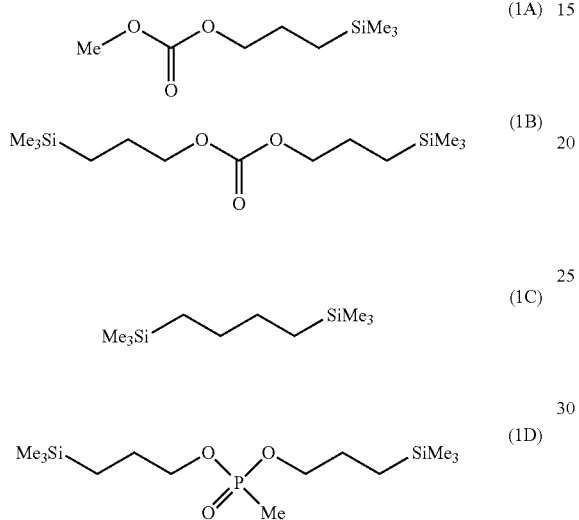

wherein Me represents a methyl group;

6. the electrolyte additive according to any one of 1 to 5, which is a voltage resistance improving agent for an electrolytic solution;

7. the electrolyte additive according to any one of 1 to 5, which is a solvent for an electrolytic solution;

8. an electrolytic solution including the electrolyte additive according to any one of 1 to 7, an organic solvent, and an electrolyte salt;

9. the electrolytic solution according to 8, wherein the organic solvent contains a carbonate;

10. the electrolytic solution according to 9, wherein the organic solvent contains two or more carbonates;

11. an electrolytic solution which contains the electrolyte additive according to any one of 1 to 7 and an electrolyte salt and is free of an organic solvent;

12. a power storage device formed using the electrolytic solution according to any one of 8 to 11;

13. a power storage device formed using the electrolyte additive according to any one of 1 to 7;

14. the power storage device according to 12 or 13, which is a secondary battery or an electric double-layer capacitor;

15. a method including adding the electrolyte additive according to any one of 1 to 7 to electrolytic solution containing a solvent and an electrolyte salt to improve the voltage resistance of the electrolytic solution;

16. a compound of the following formula (1B):

[Chem. 4]

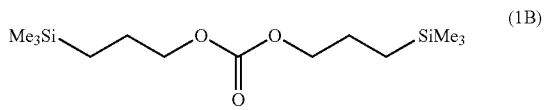

wherein Me represents a methyl group; and 17. a compound of the following formula (1D):

[Chem. 5]

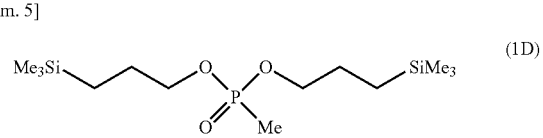

wherein Me represents a methyl group.

Advantageous Effects of Invention

A neutral compound having a trialkylsilyl group in the molecule according to the present invention can be added to an existing electrolytic solution or used as a solvent for an electrolytic solution to improve voltage resistance.

Since this compound is not ionic, the compound is not precipitated by causing salt exchange with an electrolyte, and thus can be used without any problem even in a metal ion battery system.

In a power storage device including an electrolytic solution containing the electrolyte additive of the present invention, the upper limit of the operating voltage increases, so that a higher voltage and a higher capacity density can be achieved.

DESCRIPTION OF EMBODIMENTS

Figure 1:
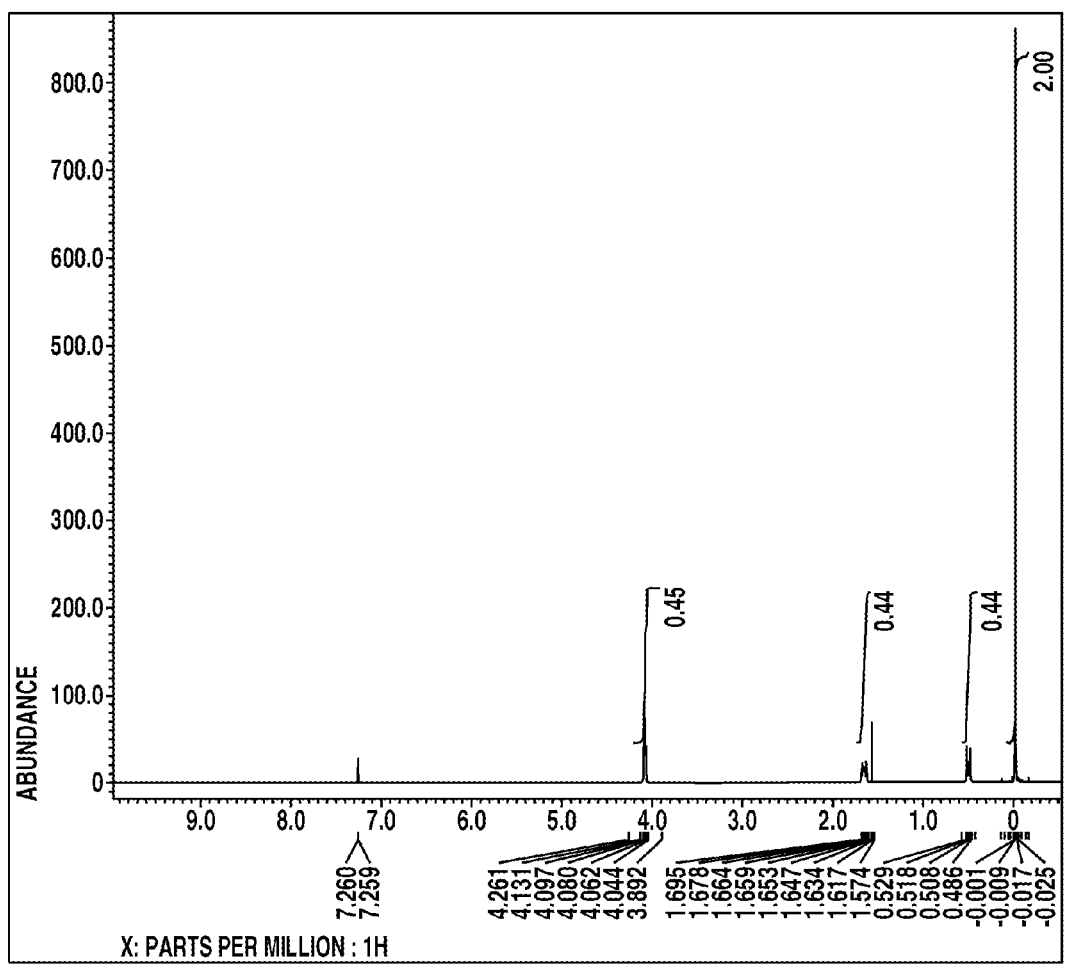
FIG. 1 is a $^1$H-NMR spectrum diagram of a compound (1B) obtained in Synthesis Example 1.

The present invention is described in more detail below.

An electrolyte additive according to the present invention includes a neutral compound of formula (1) which has a trialkylsilyl group in the molecule.

[Chem. 6]

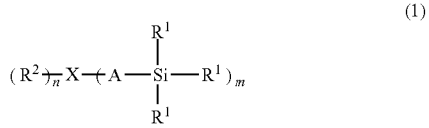

In the formula (1), R¹s each independently represent an alkyl group having 1 to 8 carbon atoms, and R²s each independently represent an alkyl group having 1 to 8 carbon atoms.

The alkyl group having 1 to 8 carbon atoms may be linear, branched or cyclic, and examples thereof include methyl, ethyl, n-propyl, i-propyl, c-propyl, n-butyl, i-butyl, s-butyl, t-butyl, c-butyl, n-pentyl, c-pentyl, n-hexyl, c-hexyl, n-heptyl, n-octyl and 2-ethylhexyl groups.

In particular, R¹ and R² are each preferably an alkyl group having 1 to 4 carbon atoms, more preferably an alkyl group having 1 to 3 carbon atoms, still more preferably a methyl group.

A represents an alkylene group having 1 to 10 carbon atoms.

The alkylene group having 1 to 10 carbon atoms may be linear, branched or cyclic, and examples thereof include methylene, ethylene, propylene, trimethylene, tetramethylene, pentamethylene, hexamethylene, heptamethylene, octamethylene, nonamethylene and decamethylene groups.

In particular, A is preferably an alkylene group having 2 to 5 carbon atoms, more preferably an ethylene, trimethylene or tetramethylene group, still more preferably an ethylene or trimethylene group.

X represents one selected from a single bond, a methylene group, and any of linking groups of the following formulae (2) to (4).

[Chem. 7]

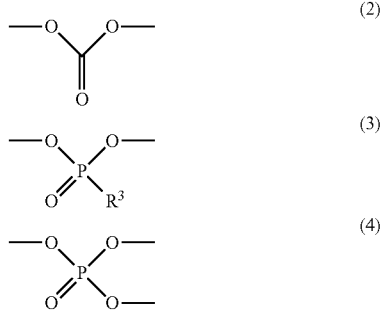

R³ in formula (3) represents an alkyl group having 1 to 8 carbon atoms, and specific examples thereof include the same groups as those exemplified above for R¹.

In particular, R³ is preferably an alkyl group having 1 to 4 carbon atoms, more preferably a methyl group.

In Formula (1), m represents an integer of 1 to 3, and n represents an integer of 0 to 2, where m+n is 2 when X is a single bond, a methylene group, a linking group of the formula (2) above, or a linking group of the formula (3) above, and m+n is 3 when X is a linking group of the formula (4) above.

In particular, compounds are preferable in which m is 2 or 3 and n is 0.

Specific examples of the compound of formula (1) include, but are not limited to, those of the following formulae (1A) to (1D).

[Chem. 8]

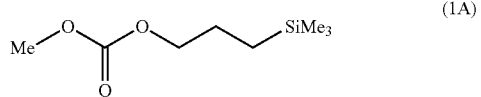

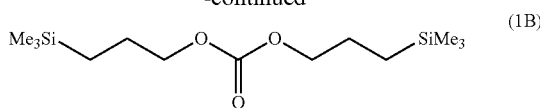

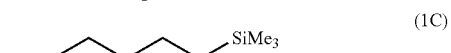

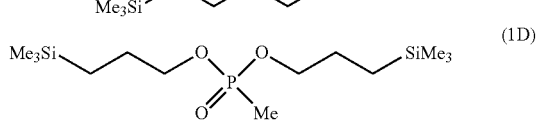

wherein Me represents a methyl group.

The above-described neutral compound having any of various trialkylsilyl groups in the molecule can be synthesized by a known method.

For example, the compound (1B) can be synthesized by, for example, a method in which 1,1'-carbonyldiimidazole is reacted with 3-trimethylsilyl-1-propanol.

Compound (1D) can be synthesized by a method such as reacting methylphosphonic acid dichloride with 3-trimethylsilyl-1-propanol in the presence of a base such as diisopropylethylamine.

Both the compound (1A) and the compound (1C) are known substances. The compound (1A) can be synthesized by, for example, a method as described in the document "M. Philipp et al., Electrochimica Acta 173 (2015) 687", and the compound (1C) can be synthesized by, for example, a method as described in page 340 of "New Edition of Experimental Chemistry 12, Metalorganic Chemistry" issued by Maruzen Publishing Co., Ltd. on Mar. 20, 1976.

The electrolyte additive of the present invention can be used added to an electrolytic solution containing an organic solvent and an electrolyte salt when used.

The organic solvent can be appropriately selected from various organic solvents heretofore used as solvents for electrolytic solutions, and specific examples thereof include alcohols such as methanol and ethanol; chain ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, ethyl cellosolve, ethyl carbitol, butyl cellosolve and butyl carbitol; heterocyclic ethers such as tetrahydrofuran, 2-methyltetrahydrofuran, 1,3-dioxolane and 4,4-dimethyl-1,3-dioxane; lactones such as γ-butyrolactone, γ-valerolactone, δ-valerolactone, 3-methyl-1,3-oxazolidine-2-one, and 3-ethyl-1,3-oxazolidine-2-one; amides such as N-methylformamide, N,N-dimethylformamide, N-methylacetamide and N-methylpyrrolidinone; carbonates such as diethyl carbonate, dimethyl carbonate, ethyl methyl carbonate, propylene carbonate, ethylene carbonate and butylene carbonate; imidazolines such as 1,3-dimethyl-2-imidazolidinone; nitriles such as acetonitrile and propionitrile; dinitriles such as adiponitrile and glutaronitrile; sulfones such as sulfolane, ethylmethyl sulfone and ethyl 2-methoxyethylsulfone; phosphoric acid esters such as methyl phosphate and triethyl phosphate; and fluorine-substituted products thereof. These solvents can be used alone or in combination of two or more thereof.

Of these, organic solvents containing a carbonate are preferable, and organic solvents containing two or more carbonates are more preferable.

On the other hand, the electrolyte salt is appropriately selected according to the type of power storage device, and specific examples thereof include lithium salts such as lithium tetrafluoroborate, lithium hexafluorophosphate, lithium bis(trifluoromethanesulfonyl)amide, lithium bis(fluorosulfonyl)amide, lithium perchlorate, lithium acetate, lithium trifluoroacetate, lithium benzoate, lithium p-toluenesulfonate, lithium nitrate, lithium bromide and lithium iodide; quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; and lithium bis(trifluoromethanesulfonyl)imide and lithium bis(fluorosulfonyl)imide.

In particular, the electrolyte additive of the present invention is a neutral molecule, and therefore can be suitably used even when a lithium salt such as lithium hexafluorophosphate is used as an electrolyte salt.

The concentration of the electrolyte salt in the electrolytic solution is not particularly limited, and is normally about 0.5 to 3 mol/L, preferably about 0.8 to 2 mol/L, more preferably about 0.9 to 1.5 mol/L.

The addition amount of the electrolyte additive of the present invention in the electrolytic solution is not particularly limited as long as a voltage resistance improving effect is exhibited, and the addition amount of the electrolyte additive is preferably 0.01 wt % or more, more preferably 0.05 wt % or more, still more preferably 0.1 wt % or more, even more preferably 0.5 wt % or more in the entire electrolytic solution (100 wt %) in view of efficiently exhibiting the voltage resistance improving effect.

The upper limit thereof is not particularly limited because the electrolyte additive can also be used as a solvent.

The electrolyte additive of the present invention can be used as a solvent for an electrolytic solution.

In this case, the electrolyte additive of the present invention may be used alone as a solvent for an electrolytic solution, or may be used in combination with the above-described various solvents for electrolytic solutions. From the viewpoint of further enhancing the voltage resistance of the electrolytic solution, it is preferable to use the electrolyte additive of the present invention alone as a solvent for an electrolytic solution, but the electrolyte additive may be appropriately mixed with another electrolytic solution in consideration of solubility of an electrolyte salt.

The power storage device in the present invention is not particularly limited, and examples thereof include various power storage devices such as electric double-layer capacitors, lithium ion capacitors, redox capacitors, lithium secondary batteries, lithium ion secondary batteries, lithium air batteries, and proton polymer batteries.

The power storage device of the present invention is not particularly limited as long as it includes an electrolytic solution containing the above-described electrolyte additive, and examples thereof include those in which an electrolytic solution containing the electrolyte additive of the present invention is applied to a general secondary battery including a positive electrode having a positive electrode current collector and a positive active material layer formed on a surface of the positive electrode current collector, a negative electrode having a negative electrode current collector and a negative active material layer formed on a surface of the negative electrode current collector and a separator interposed between the electrodes, or an air battery including a positive electrode (air electrode) layer, a negative electrode layer and an electrolytic solution layer disposed between the electrodes; and those in which an electrolytic solution containing the electrolyte additive of the present invention is applied to an electric double-layer capacitor including a pair of polarizable electrodes, a separator interposed between the electrodes, and an electrolytic solution.

Each material forming the secondary battery may be appropriately selected from known materials, and is not particularly limited. An example thereof is as follows.

Specific examples of the positive electrode current collector include aluminum foil and aluminum alloy foil, and three-dimensional porous materials such as foamed products and nonwoven fabric-shaped products thereof can also be used as the current collector.

Specific examples of the positive active material include carbonaceous materials such as activated carbon and carbon nanotubes, which are capable of reversibly supporting lithium, and lithium oxides having an olivine-type crystal structure, a layered rock salt-type crystal structure or a spinel-type crystal structure. Examples of the activated carbon raw material include coconut husk, phenol resin and petroleum coke, and examples of the method for activating the activated carbon raw material include a water vapor activation method and a molten alkali activation method. Examples of the lithium oxide include complex oxides having a general formula of $LiMPO_4$ (M is one or more of Fe (II), Mn (II), Co (II) and Ni (II)), and NiCo-based compounds such as lithium cobalt oxide ($LiCoO_2$), $LiNiO_2$, $LiMnO_2$, $Li_2MnO_3$, and $LiNi_{0.8}Co_{0.2}O_2$.

Specific examples of the negative electrode current collector include copper foil, copper alloy foil, nickel foil, nickel alloy foil, stainless steel foil, aluminum foil and aluminum alloy foil.

Specific examples of the negative active material are not particularly limited as long as it is a material capable of absorbing and releasing lithium ions, and examples thereof include carbonaceous materials (e.g. graphite), silicon oxides, silicon alloys, tin oxides, tin alloys, lithium, and metals capable of forming lithium alloys, e.g. aluminum, lead, tin, indium, bismuth, silver, barium, calcium, mercury, palladium, platinum, tellurium, zinc and lanthanum. These materials may be used alone or in combination of two or more thereof. Carbonaceous materials or lithium complex oxides are preferable from the viewpoint of safety. Further, Ti (titanium), Li (lithium) or a material containing both Ti and Li (e.g. lithium titanate) is preferable from the viewpoint of high current density charge-discharge characteristics.

The positive active material and the negative active material may be used together with a conductive material.

Examples of the conductive material include carbon black, Ketjen black, acetylene black, carbon whisker, carbon fiber, natural graphite, artificial graphite, titanium oxide, The positive active material layer and the negative active material layer can be formed by applying an electrode slurry containing the above-described active material, a binder polymer and a conductive material and a solvent if necessary onto the current collector, and performing drying under heating if necessary.

The binder polymer can be appropriately selected from known materials, and examples thereof include polyvinylidene fluoride (PVdF), polyvinylpyrrolidone, polytetrafluoroethylene, tetrafluoroethylene-hexafluoropropylene copolymers, vinylidene fluoride-hexafluoropropylene copolymers [P(VDF-HFP)], vinylidene fluoride-trifluoroethylene chloride copolymers [P(VDF-CTFE)], polyvinyl alcohol, ethylene-propylene-diene terpolymers, styrene-butadiene rubber and carboxymethyl cellulose (CMC).

The solvent is selected according to the type of binder polymer, and N-methyl-2-pyrrolidone or water is generally used.

The electrode on which the active material layer is formed may be pressed if necessary.

Specific examples of the separator include polyolefin-based separators such as polyethylene and polypropylene, polyester-based separators such as polyethylene terephthalate, polyamide-based separators, polyimide-based separators, cellulose-based separators and glass fiber-based separators.

Each material forming the electric double-layer capacitor may also be appropriately selected from known materials, and is not particularly limited. An example thereof is as follows.

Examples of the general polarizable electrode include those obtained by applying a composition containing a carbonaceous material, a binder polymer, and a conductive material if necessary onto a current collector.

The carbonaceous material is not particularly limited, and examples thereof include various known carbonaceous materials, e.g. activated carbon, graphite, graphene, carbon nanotubes, carbon nanofiber and carbon nanohorn.

Specific examples of the positive electrode current collector include aluminum foil and aluminum alloy foil.

Specific examples of the negative electrode current collector include copper foil, copper alloy foil, nickel foil, nickel alloy foil and stainless steel foil.

In addition, examples of the binder polymer and the conductive material include the same materials as those exemplified for the secondary battery.

In addition, a solvent may be used during preparation of the composition. The solvent is selected according to the type of the binder polymer, and in this case, N-methyl-2-pyrrolidone or water is also suitable.

Specific examples of the separator include the same materials as those exemplified for the secondary battery.

The power storage device in the present invention can be obtained by, for example, laminating, folding or winding a device structure formed by interposing a separator between a pair of electrodes, forming the device structure into a coin shape or the like if necessary, housing the device structure in a battery container such as a battery can or a laminate pack, filling the battery container with an electrolytic solution containing the electrolyte additive of the present invention, and sealing the battery container in the case of a battery can and heat-sealing (heat-welding) the battery container in the case of a laminate pack.

EXAMPLES

Synthesis Examples, Examples and Comparative Examples are given below to more concretely illustrate the invention, although the invention is not limited by these Examples. The analysis apparatus and conditions used are as follows.

[1] $^1$H-NMR Spectrum
  Apparatus: ECZ-400S manufactured by JEOL Ltd.
[2] Cyclic Voltammetry
  Apparatus: electrochemical measuring apparatus HSV-100 manufactured by HOKUTO DENKO CORPORATION.
  Constant-temperature thermostat bath:
    SU-241 manufactured by ESPEC Corporation
  Measurement conditions:
    In a dry environment, measurement was performed at a temperature of 25° C. and a sweep rate of 5 mV/sec using a glassy carbon electrode as a working electrode, a platinum electrode as a counter electrode, and a Ag/AgNO$_3$ electrode as a reference electrode.

[1] Synthesis of Electrolyte Additive

[Synthesis Example 1] Synthesis of Compound (1B)

[Chem. 9]

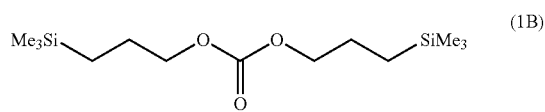

(1B)

6.49 g of 1,1'-carbonyldiimidazole (manufactured by Tokyo Chemical Industry Co., Ltd.) was weighed in an eggplant flask, and the flask was cooled in ice. While the eggplant flask was cooled in ice, 11.64 g of 3-trimethylsilyl-1-propanol (manufactured by Sigma-Aldrich Co. LLC.) was slowly added dropwise with stirring.

After completion of the dropwise addition, the ice bath was removed. After returning to room temperature, the mixture was heated to 80° C. in an oil bath, and continuously stirred at this temperature for 2 hours. The oil bath was removed to return the mixture to room temperature, 100 ml of hexane (manufactured by Wako Pure Chemical Industries, Ltd.) was then added, and the mixture was transferred into a separatory funnel. 100 ml of water was added, the mixture was shaken and left to stand, washing operation for removing the lower aqueous layer was performed three times, and the upper layer was then concentrated by removing the solvent using an evaporator and then a vacuum pump. The resulting reaction mixture was purified by treatment with a silica gel column with a hexane:ethyl acetate (manufactured by Wako Pure Chemical Industries, Ltd.) at 4:1 (v/v) as a developing solvent to obtain 10.06 g of a target compound (1B). FIG. 1 shows a $^1$H-NMR chart (solvent: deuterochloroform) of the compound (1B).

[Synthesis Example 2] Synthesis of Compound (1D)

[Chem. 10]

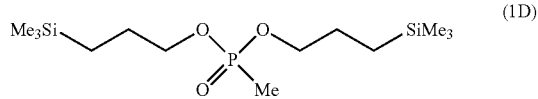

(1D)

Figure 2:
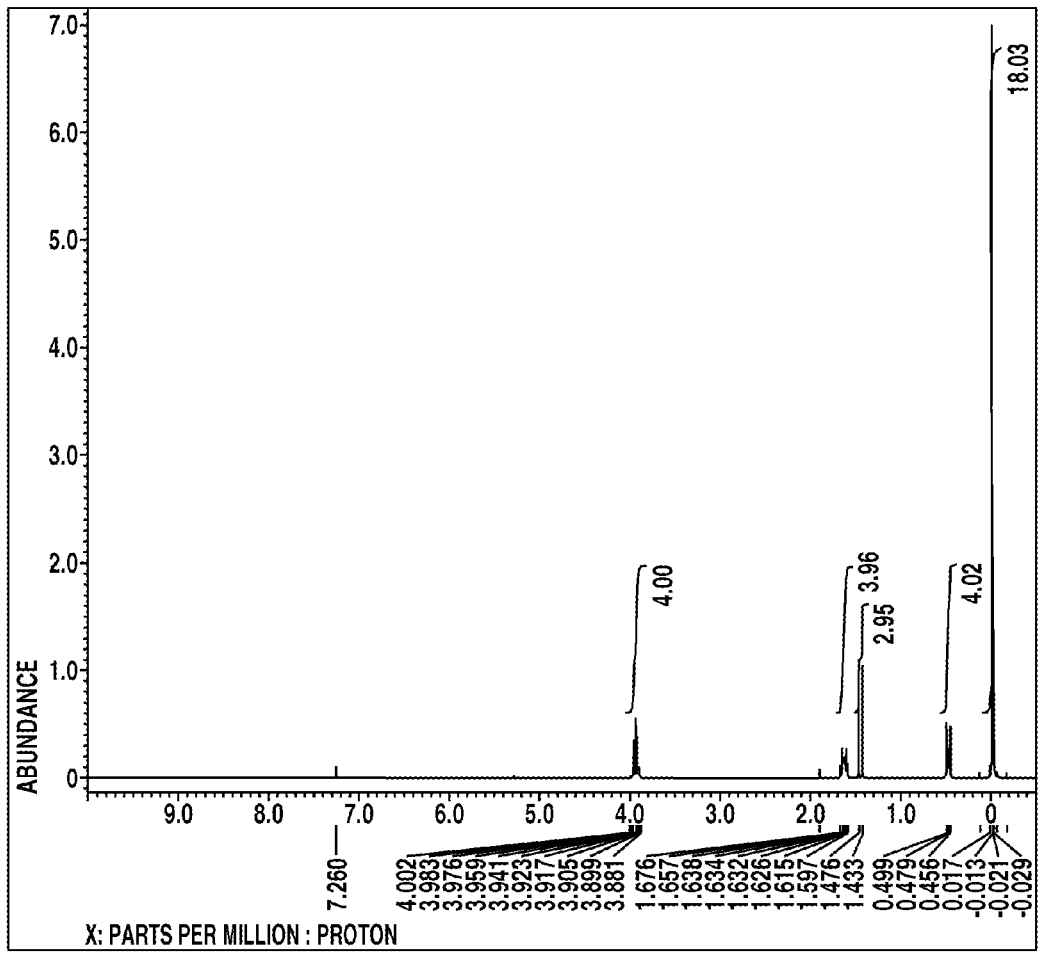
FIG. 2 is a $^1$H-NMR spectrum diagram of a compound (1D) obtained in Synthesis Example 2.

7.67 g of methylphosphonic acid dichloride (manufactured by Tokyo Chemical Industry Co., Ltd.) and 0.32 g of 1H-tetrazole (manufactured by Wako Pure Chemical Industries, Ltd.) were dissolved in 709 ml of toluene (manufactured by Wako Pure Chemical Industries, Ltd.). 15.20 g of 3-trimethylsilyl-1 propanol and 10.86 ml of diisopropylethylamine (manufactured by Tokyo Chemical Industry Co., Ltd.) were added dropwise for about 2 hours with vigorous stirring, and the mixture was then stirred overnight. On the next day, silica gel was charged with the reaction solution as such, and separated and purified by silica gel column chromatography with diethyl ether (manufactured by Kanto Chemical Co., Inc.) and ethyl acetate at 9:1 (v/v) to obtain 11.54 g of a compound (1D) as a target compound. FIG. 2 shows a $^1$H-NMR chart (solvent: deuterochloroform) of the compound (1D).

[Synthesis Example 3] Synthesis of Compound (1A)

[Chem. 11]

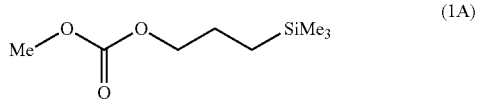
(1A)

The compound (1A) is a known substance and can be synthesized by a known method.

Here, methyl chloroformate was reacted with 3-triethylsilylpropanol, and the reaction product was purified by distillation to obtain the compound (1A).

[Synthesis Example 4] Synthesis of Compound (1C)

[Chem. 12]

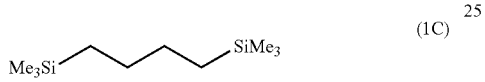
(1C)

The compound (1C) is a known substance, and can be synthesized by a known method.

Here, the compound (1C) was synthesized by the method described in page 340 of "New Edition of Experimental Chemistry 12, Metalorganic Chemistry" issued by Maruzen Publishing Co., Ltd. on Mar. 20, 1976.

[2] Preparation of Electrolytic Solution

Example 1

Compound (1B) was added to a 1M $LiPF_6$ dimethyl carbonate (DMC) solution to a concentration of 1 wt % by to prepare an electrolytic solution.

Examples 2 to 4

An electrolytic solution was prepared in the same manner as in Example 1 except that the compound (1D), the compound (1A) or the compound (1C) was used.

Figure 3:
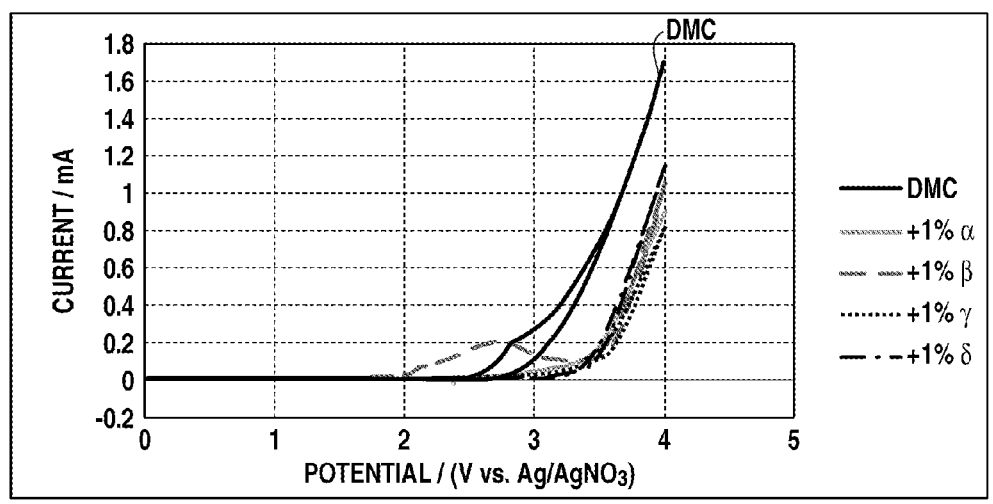
FIG. 3 is a diagram showing the results of cyclic voltammetry measurement (oxidation side) in Examples 1 to 4 and Comparative Example 1.
Figure 4:
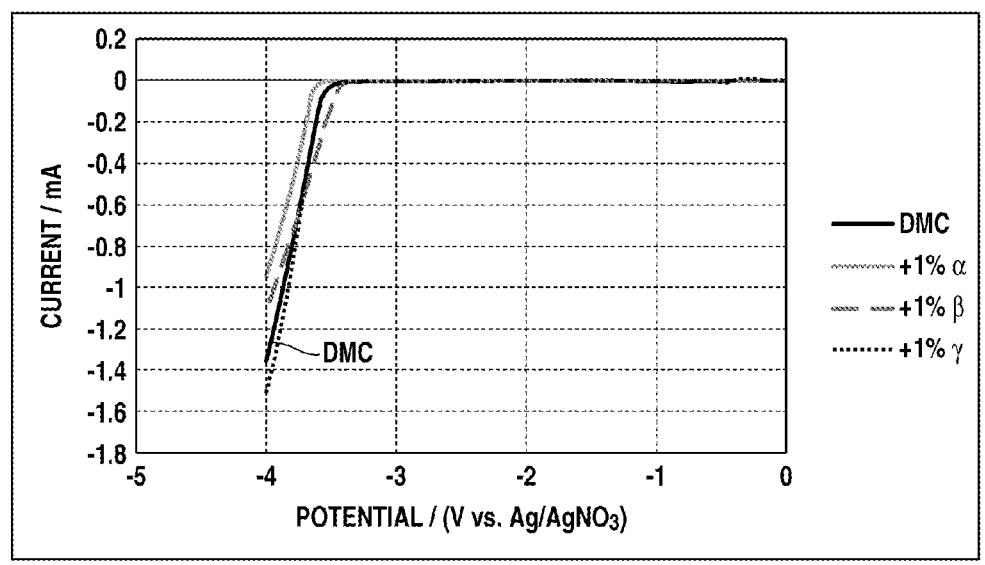
FIG. 4 is a diagram showing the results of cyclic voltammetry measurement (reduction side) in Examples 2 to 4 and Comparative Example 1.

Cyclic voltammetry measurement was performed for the electrolytic solution prepared in Examples 1 to 4 and the 1M $LiPF_6$ DMC solution (Comparative Example 1). FIGS. 3 and 4 show the measurement results.

As shown in FIG. 3, electrolytic solutions prepared by adding the electrolyte additive of the present invention has higher voltage resistance on the oxidation side as compared to electrolytic solutions free of the additive. On the other hand, there is no significant effect on the potential window on the reduction side as shown in FIG. 4.

In FIGS. 3 and 4, α represents the compound (1D), β represents the compound (1C), γ represents the compound (1A), and δ represents the compound (1B).

The invention claimed is:

1. An electrolyte additive comprising a neutral compound of formula (1) which has a trialkylsilyl group in the molecule:

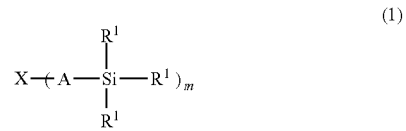
(1)

wherein $R^1$s each independently represent an alkyl group having 1 to 8 carbon atoms, A represents an alkylene group having 1 to 10 carbon atoms, X represents one selected from any one of linking groups of the following formulae (2) to (4), m represents an integer of 2 to 3, where m is 2 when X is a linking group of the following formula (2) or a linking group of the following formula (3), and m is 3 when X is a linking group of the following formula (4):

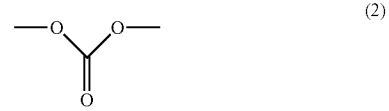
(2)

(3)

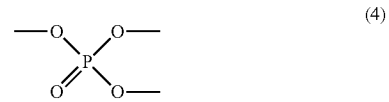
(4)

wherein $R^3$ in formula (3) represents an alkyl group having 1 to 8 carbon atoms.

2. The electrolyte additive according to claim 1, wherein said $R^1$s each independently represent an alkyl group having 1 to 4 carbon atoms, said X represents one selected from any one of linking groups of the formulae (2) and (3), m is 2.

3. The electrolyte additive according to claim 1, wherein each of all $R^1$s is a methyl group.

4. The electrolyte additive according to claim 1, wherein A is an alkylene group having 2 to 5 carbon atoms.

5. The electrolyte additive according to claim 1, comprising any of compounds of the following formulae (1B) and (1D):

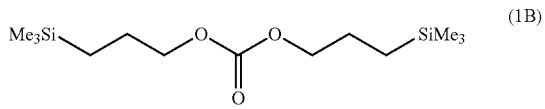 [SMILES: C[Si](C)(C)CCCOC(=O)OCCC[Si](C)(C)C]
(1B)

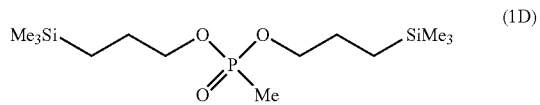 [SMILES: C[Si](C)(C)CCCOP(C)(=O)OCCC[Si](C)(C)C]
(1D)

wherein Me represents a methyl group.

6. The electrolyte additive according to claim 1, which is a voltage resistance improving agent for an electrolytic solution.

7. The electrolyte additive according to claim 1, which is a solvent for an electrolytic solution.

8. An electrolytic solution comprising the electrolyte additive according to claim 1, an organic solvent and an electrolyte salt.

9. The electrolytic solution according to claim 8, wherein the organic solvent contains a carbonate.

10. The electrolytic solution according to claim 9, wherein the organic solvent contains two or more carbonates.

11. An electrolytic solution which contains the electrolyte additive according to claim 1 and an electrolyte salt and is free of an organic solvent.

12. A power storage device formed using the electrolytic solution according to claim 8.

13. A power storage device formed using the electrolyte additive according to claim 1.

14. The power storage device according to claim 12, which is a secondary battery or an electric double-layer capacitor.

15. A method comprising adding the electrolyte additive according to claim 1 to electrolytic solution containing a solvent and an electrolyte salt to improve the voltage resistance of the electrolytic solution.

16. A compound of the following formula (1B):

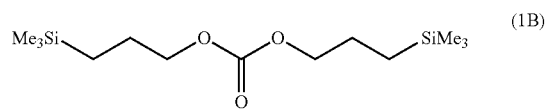

wherein Me represents a methyl group.

17. A compound of the following formula (1D),

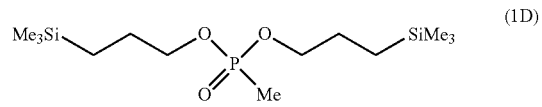

wherein Me represents a methyl group.

* * * * *